United States Patent [19]
Hu

[11] Patent Number: 5,847,259
[45] Date of Patent: Dec. 8, 1998

[54] COMPUTER PROGRAM, SYSTEM AND METHOD TO SPECIFY SINUSOIDAL VIBRATION TESTS FOR PRODUCT DURABILITY VALIDATION

[75] Inventor: Jun Ming Hu, Canton, Mich.

[73] Assignee: Ford Motor Company, Dearborn, Mich.

[21] Appl. No.: 723,384

[22] Filed: Sep. 30, 1996

Related U.S. Application Data

[63] Continuation-in-part of Ser. No. 566,242, Dec. 1, 1995, Pat. No. 5,565,618.

[51] Int. Cl.⁶ ..................................................... G01M 7/00
[52] U.S. Cl. ............................................. 73/1.01; 364/508
[58] Field of Search ........................... 73/1.01, 662, 808, 73/811, 865.8, 866.4; 364/508

[56] References Cited

U.S. PATENT DOCUMENTS

| | | |
|---|---|---|
| 3,710,082 | 1/1973 | Sloane et al. |
| 5,012,428 | 4/1991 | Ueno et al. |
| 5,065,618 | 11/1991 | Hodges, Sr. et al. ........... 73/105 |
| 5,179,860 | 1/1993 | Tsuboi . |
| 5,291,419 | 3/1994 | Satoh et al. |

FOREIGN PATENT DOCUMENTS

| | | |
|---|---|---|
| 0 115 185 A2 | 12/1983 | European Pat. Off. . |
| PCT/GB96/ 02965 | 12/1996 | United Kingdom . |

*Primary Examiner*—Robert Raevis
*Attorney, Agent, or Firm*—Richard D. Dixon

[57] ABSTRACT

An application program and computer system for determining the testing profile for accelerated laboratory sinusoidal vibrational testing of a product, includes the application program steps of (i) selecting the type and rate for the frequency sweep, (ii) developing a simplified composite Power Spectral Density function $PSD_j$ representing expected field vibration levels, (iii) developing the acceleration force function $G_T(f)$ corresponding to the PSD function, (iv) determining the stress response curve $H(f)$ for the product, (v) selecting the number of frequency sweeps $N_W$ based on the testing equipment, the testing time available, and the range of acceleration forces required for implementing $G_T(f)$ from the relationship $$G_u = \left\{ \frac{Kx(\sqrt{2})^m \Gamma\left(\frac{m}{2} - 1\right) \sum_i \frac{M_i f_{0,i}}{\lambda_i \nu_i} \left[\int_0^{200} PSD_{g,i}(f) H^2(f) df\right]^{\frac{m}{2}}}{N_W \left[\int_0^{50} H^m(f) df + \int_{50}^{100} a^m H^m(f) df - \int_{100}^{150} b^m H^m(f) df - \int_{150}^{200} c^m H^m(f) df \right]} \right\}^{\frac{1}{m}}$$

where K is a constant, (vi) recalculating the acceleration forces $G_u$, and then (vii) testing the product using the selected variables to validate the required performance lifetime for the product when no test failures are observed over all of the $N_W$ test sweeps.

17 Claims, 6 Drawing Sheets

COMPUTER PROGRAM, SYSTEM AND METHOD TO SPECIFY SINUSOIDAL VIBRATION TESTS FOR PRODUCT DURABILITY VALIDATION

This application is a continuation-in-part application of Ser. No. 08/566,242 filed Dec. 1, 1995, now U.S. Pat. No. 5,565,618, issued on Oct 15, 1996.

BACKGROUND OF THE INVENTION

1. Field of the Invention

The present invention relates to a computer program and method for validating the operational durability of an electronic product based upon accelerated laboratory sinusoidal vibration tests employing the physics-of-failure and damage correlation.

2. Description of the Prior Art

The vibration loading applied on automotive components during actual operating conditions is the combination of several random processes corresponding to different field driving routes. In order to improve quality and reduce testing time and cost, laboratory tests are usually conducted on products in an accelerated manner. In the automotive industry, accelerated testing using sinusoidal vibration is widely used due to the low equipment cost and the convenience in test set up and monitoring. Product durability is correctly validated by this sinusoidal vibration test provided that this data can be correctly correlated to actual field data.

An objective of the present invention is to develop a testing methodology to determine sinusoidal vibration testing methodologies based on the physics-of-failure and damage equivalence technique such that the vibration damage generated in the laboratory test will be equivalent to the damage induced by random vibration in the field. Based on the field random vibration profiles and the desired product life goal, an equivalent laboratory sinusoidal vibrational testing environment, including the vibration level and test time, is defined. If a product survives this laboratory test environment, it can survive in the field during the desired life time.

SUMMARY OF THE INVENTION

The present invention describes a computer program and method for determining the testing profile for accelerated laboratory sinusoidal vibrational testing of a product, comprising the steps of:

(i) selecting the type and rate for the frequency sweep too be used in the accelerated testing, (ii) developing a simplified composite Power Spectral Density function $PSD_j$, including scaling coefficients, representative of the PSD for random vibration loadings in expected field vibration levels, (iii) developing the acceleration function $G_T(f)$, corresponding to $PSD_j$ and using the PSD scaling coefficients, for producing on the product the test acceleration forces corresponding to the $PSD_j$ function, (iv) calculating the stress response curve $H(f)$ for the product representative of the transmissibility function from the input acceleration forces to the local vibration stress forces, (v) calculating the range of acceleration forces $G_u$ required for implementing $G_T(f)$ from the relationship $$G_u = \left\{ \frac{1) \sum_i \frac{M_i f_{0,i}}{\lambda_i v_i} \left[ \int_0^{200} PSD_{g,i}(f) H^2(f) df \right]^{\frac{m}{2}}}{N_w \left[ \int_0^{50} H^m(f) df - \int_{50}^{100} a^m H^m(f) df - \int_{100}^{150} b^m H^m(f) df - \int_{150}^{200} c^m H^m(f) df \right]} \right\}^{\frac{1}{m}}$$

and then selecting the number of frequency sweeps $N_w$ based on the capabilities of the testing equipment and the testing time available, (vi) recalculating the acceleration forces $G_u$ based on the scaling coefficients and the selected value of $N_w$, and then (vii) testing the product using the selected sweep type, sweep rate, $G_u$ acceleration forces and $N_w$ number of frequency sweeps, to validate the required performance lifetime for the product when no test failures are observed over all of the $N_w$ test sweeps.

BRIEF DESCRIPTION OF THE DRAWINGS

Other objects, features and advantages of the invention will be apparent from a study of the written descriptions and the drawings in which.

DEVELOPMENT OF ACCELERATED TESTING ASSUMPTIONS

ESTIMATION OF THE DAMAGE IN FIELD

Fatigue damage under random vibration can be estimated based on Miner's rule:

$$D = \int_0^\infty \frac{n(S_A)}{N(S_A)} dS_A = \sum_i \frac{n_i(S_A)}{N_i(S_A)} \qquad 1$$

where $n(S_A)$ is the number of cycles applied at stress amplitude level of $S_A$, and $N(S_A)$ is the mean cycles to failure at the applied stress $S_A$. Usually, the relation between $S_A$ and $N(S_A)$ (the S-N curve) is expressed by the following formula:

$$N + C\,S_A^{-m} \qquad 2$$

where C and m are material properties for a given temperature, mean stress, and surface condition.

Figure 1:
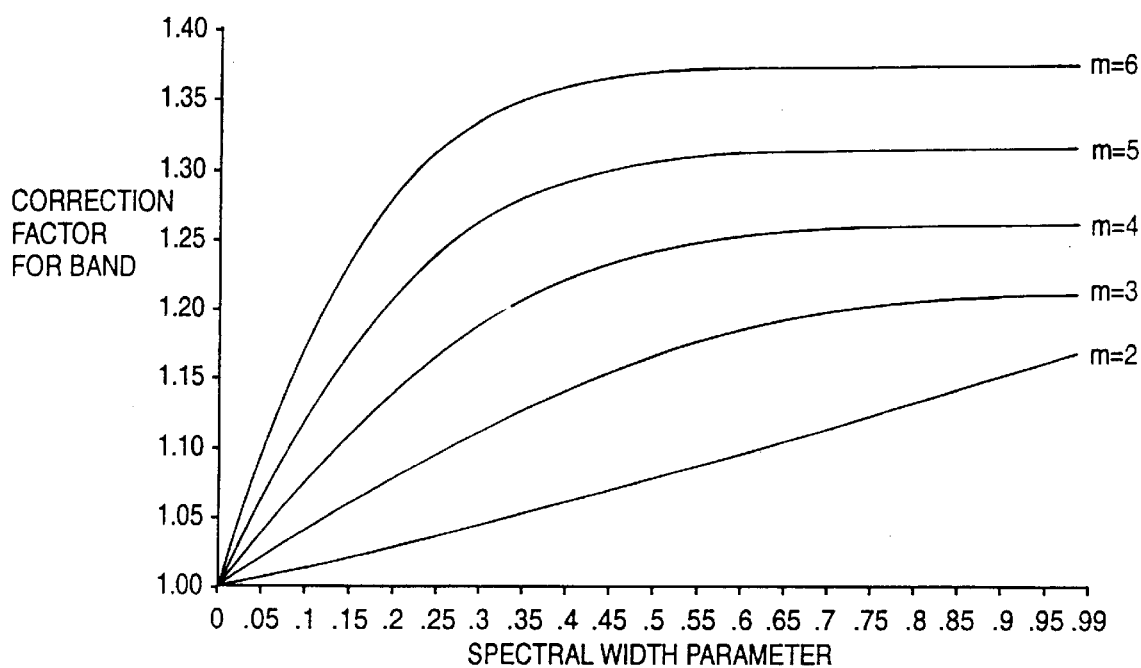
FIG. 1 is a plot showing the Correction Factor for wideband random vibration.

Assuming that the random vibrations produced by each road surface are a stationary Gaussian process or distribution, the total cumulative damage for all field routes can be estimated by the following equation:

$$D_F = \sum_i D_i = \qquad 3$$

$$\sum_i \frac{3600 M_i f_{0,i}(\sqrt{2})^m \Gamma\left(\frac{m}{2}-1\right)}{\lambda_i v_i C} \left\{ \int_{f_{min}}^{f_{max}} PSD_{g,i}(f) H^2(f) df \right\}^{\frac{m}{2}}$$

where $M_i$ is the operating miles for ith road surface; $\Gamma(.)$ is the Gamma function; $l_i$ is the correction factor for bandwidth as shown in FIG. 1; $v_i$ is the driving speed (in MPH) for measuring Power Spectral Density (PSD); and $PSD_{g,i}$ (f) is the power spectral density (PSD) function of the field input acceleration. H(f) is the stress response function, which is the transmissibility from the input acceleration to the local stress that can be obtained from dynamic stress analysis by using CAE tools; and $f_{min}$ and $f_{max}$ are the lower bound and upper bound of applied frequencies. The boundary is determined so that the values of $PSD_g$ (f) outside of the boundary are less than 0.001 of the peak value. The term $f_{o,i}$ in Equation 3 is the average frequency determined by the following equation:

$$f_{0,i} = \sqrt{\frac{\int_0^\infty f^2 PSD_{g,i}(f) H^2(f) df}{\int_0^\infty PSD_{g,i}(f) H^2(f) df}} \qquad 4$$

ESTIMATION OF DAMAGE INDUCED IN LABORATORY SINUSOIDAL TESTING

In laboratory testing, logarithmic sweep and linear sweep tests are conventionally conducted at a constant rate. For the logarithmic sweep:

$$\text{Log } f = At + B \qquad 5$$

where A and B are constants to determine the sweep rate. From Equation 5, it can be determined that:

$$dt = \frac{1}{A \ln 10 f} df \qquad 6$$

The actual number of cycles for each frequency interval then can be estimated by:

$$\Delta n = f \Delta t = \qquad 7$$

$$\frac{f}{A \ln 10} \left\{ \log\left(f + \frac{\Delta f}{2}\right) - \log\left(f - \frac{\Delta f}{2}\right) \right\} = \frac{1}{A \ln 10} \Delta f$$

Writing Dn as $n_i(S_A)$ and substituting Equations 2 and 7 into Equation 1 gives the total damage in logarithmic sweep test, $D_T$:

$$D_T = \frac{2 x N_W}{A \ln 10 C} \int_{f_{min}}^{f_{max}} G_T{}^m(f) H^m(f) df \qquad 8$$

where $G_T$ (f) is the amplitude of the input acceleration in the test, and $N_w$ is the required test life in terms of the number of sinusoidal sweeps (from low to high frequency and back from high to low frequency). For a linear sweep:

$$f = A't + B' \qquad 9$$

where A' and B' are constants to determine the sweep rate. From Equation 9, it can be determined that:

$$dt = \frac{1}{A'} df \qquad 10$$

The actual number of cycles for each frequency interval can then be estimated by:

$$\Delta n = f \Delta t = \frac{f}{A'} \Delta f \qquad 11$$

Therefore the total damage in a linear sweep test can be estimated by:

$$D_T = \frac{2 x N_W}{A'C} \int_{f_{min}}^{f_{max}} f G_T{}^m(f) H^m(f) df \qquad 12$$

As indicated in Equation 7, the logarithmic frequency sweep gives the same number of cycles for a given frequency increment as the linear sweep testing, and is independent of the frequency level. However, for the same frequency increment, the linear sweep gives a large number of cycles at high frequency according to Equation 11.

In reality, the cycles of very large acceleration amplitude (corresponding to low frequency) and those of very small acceleration amplitude (corresponding to high frequency) are fewer than the cycles of the medium acceleration amplitude (according to the central limit theorem). Therefore, a logarithmic frequency sweep is more desirable than a linear frequency sweep in the laboratory testing, because the latter may result in too many cycles in the high frequency range.

The sweep rate should not be so high that the structure cannot build-up the expected response, and the sweep rate should not be so low that the physical effects of the sequence between the large amplitude and the small amplitude is not produced- In one preferred example for an automotive instrument cluster and associated electronic equipment modules, a 10-minute sweep from 5 Hz to 200 Hz is appropriate. For this case, sweeping from 5 Hz to 200 Hz for 10 minutes (f=5 Hz at t=0, and f=200 Hz at t=600) results in the values of the constants A=0.00267 and B=0.7, which gives:

$$\Delta n = f \Delta t = 162.65 \Delta f \qquad 13$$

Therefore, the total damage in the accelerated laboratory test is calculated as:

$$D_T = \frac{2 \times 162.5 \, x N_W}{C} \int_{f_{min}}^{f_{max}} G_T^m(f) H^m(f) df \qquad 14$$

DAMAGE EQUIVALENCE TECHNIQUE

The previously explained approximations allow the development of a laboratory testing methodology with a defined testing duration so that the damage generated in the laboratory with the defined test duration is the same as that generated in the field for the period of desired product life time. That is:

$$D_f(\text{life time}) = D_T(\text{test duration}) \qquad 15$$

Therefore, from Equations 3 and 14, the required laboratory test levels can be calculated if an appropriate test duration is specified, or the required test duration can be calculated if the appropriate test levels are specified. The number of sinusoidal sweeps $N_w$ becomes:

$$N_W = \frac{11.1(\sqrt{2})^m \, \Gamma\left(\frac{m}{2} - 1\right)}{\int_{f_{min}}^{f_{max}} G_T^m(f) H^m(f) df} \sum_i \frac{M_i f_{0,i}}{\lambda_i v_i} \left\{ \int_{f_{min}}^{f_{max}} PSD_{g,i}(f) H^2(f) df \right\}^{\frac{m}{2}} \qquad 16$$

Equation 16 shows that the required number of sinusoidal sweeps is dependent on the fatigue properties of the material and the stress response function (that can be determined by finite element analysis). The product lifetime requirement is reflected in the distance traveled by the vehicle (in miles) for each route, $M_i$.

DETERMINATION OF LABORATORY TEST REQUIREMENT

In order to correlate the laboratory sinusoidal testing to random vibrations observed in the field, a method to specify the durability test specification may be based on the damage equivalence technique, with the field loading measurement used as the input variable. The determination of the laboratory test requirements corresponding to typical field environments and lifetime goals include the determination of sweep type and sweep rate, the shape (or scaling factor) of the laboratory test profile, the number of test sweeps, and the levels of the laboratory test profile. In order to determine these parameters, the typical PSDs as measured in the field should be simplified, and the stress response curve of the product should be calculated.

DESCRIPTION OF THE PREFERRED ACCELERATED TESTING METHOD

Based on the assumptions and theory discussed above, a method for determining the vibration test requirements for accelerated product durability verification may be expressed in the following steps:

(i) Select sweep type and sweep rate

The logarithm frequency sweep gives the same number of cycles for a given frequency increment and is independent of the frequency level. However, for the same frequency increment, the linear sweep gives a large number of cycles of high frequency. In reality, a logarithm frequency sweep is more reasonable than the linear frequency sweep, because the latter may result in too many cycles in the high frequency range. For these reasons, the logarithmic frequency sweep is used in the preferred testing method.

The sweep rate should not be so high that the structure cannot build up the expected response. The sweep rate should not be so low that the effect of the sequence between the large amplitude and the small amplitude does not provide an appropriate distribution of loading. It is believed that a 10-minute sweep from 5 Hz to 200 Hz (A=0.00267) is appropriate, but sweep rates of from 5 minutes to 30 minutes may be used as required for particular accelerated testings. For components subjected to high frequency environments, frequencies of up to 2,000 Hz may be required.

(ii) Simplify the field-measured PSDs

Figure 3:
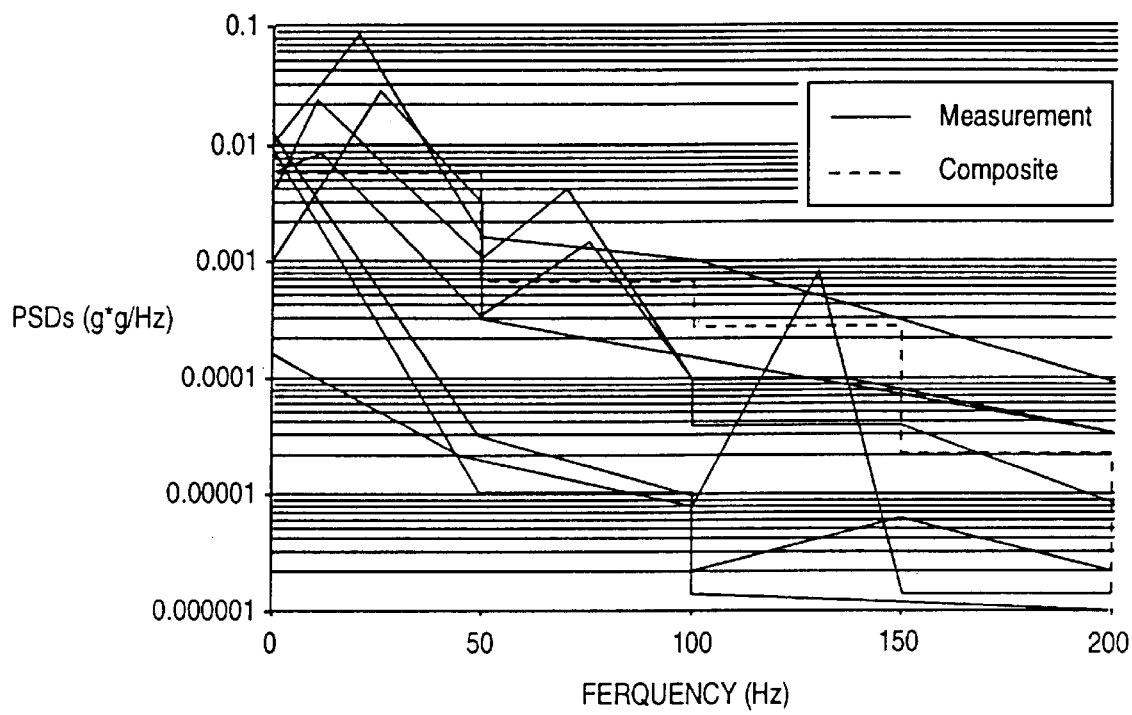
FIG. 3 illustrates an example of the stress-frequency response curve with unit acceleration at the critical point.
Figure 4:
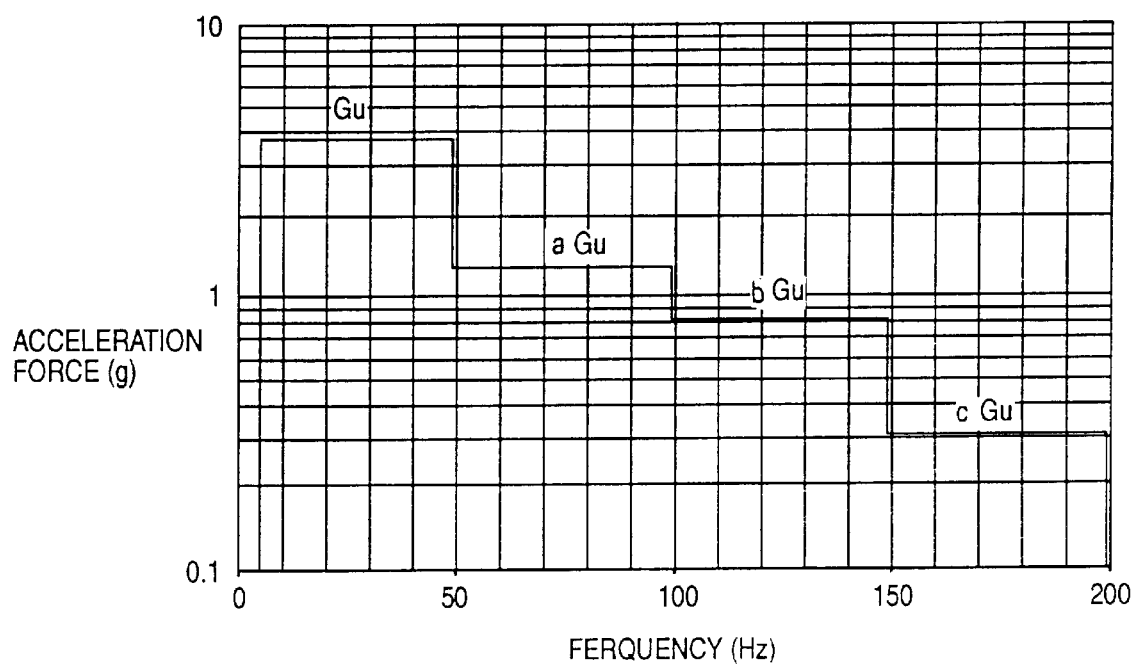
FIG. 4 is a plot of test loading level versus frequency for the laboratory acceleration sweep profile.

The field random vibration loadings are the power spectral density (PSD) curves measured for each road surface typically encountered. The composite PSD curve is illustrated in FIG. 3 as representing the typical vehicle vibration environment at a typical product mounting location. The composite PSD curve is derived from PSD data measured in the field and then simplified into a four-level step function as illustrated by the dashed line in FIG. 3. The frequencies at the stepping point of each level are specified as $f_0=0$, $f_1=50$, $f_2=100$, $f_3=150$, and $f_4=200$ Hz. This assumption set may not be appropriate for simulating vibration for an engine mounted component. The levels of the composite PSD ($PSD_1$, $PSD_2$, $PSD_3$ and $PSD_4$) are determined by the weighted average (energy equivalence) as follows:

$$PSD_j = \frac{\sum_i \frac{M_i f_{g,i}}{v_i} \int_{f_{j-1}}^{f_j} PSD_{g,i}(f) df}{(f_j - f_{j-1}) \sum_i \frac{M_i f_{g,i}}{v_i}} \quad j = 1, 2, 3, 4 \qquad 17$$

where the average frequency $f_{g,i}$ is calculated according to Equation 4. Therefore, the composite PSD for the representative product mounting location can be expressed as follows:

$$PSD_i = \begin{bmatrix} PSD_1 & 0 & f & 50 \\ a^2 \, PSD_1 & 50 & f & 100 \\ b^2 \, PSD_1 & 100 & f & 150 \\ c^2 \, PSD_1 & 150 & f & 200 \end{bmatrix} \qquad 18$$

where $a^2$ is the ratio of $PSD_1$ and $PSD_2$, $b^2$ is the ratio of $PSD_1$ and $PSD_3$, and $c^2$ is the ratio of $PSD_1$ and $PSD_4$. The coefficients $a^2$, $b^2$ and $c^2$ correspond to the relative energy levels of the multiple frequency bands in the composite PSD, as illustrated in FIGS. 3 and 4.

(iii) Determine the shape of the laboratory test profile

The shape of the laboratory test force profile is determined according to the shape of the simplified composite PSD curve. In order to insure that the input energy distribution (in the frequency domain) of the test is similar to what will be encountered in the field, the following step function should be used as the sinusoidal acceleration input (acceleration forces measured in g-force units) because it simulates a step function of PSD expressed in Equation 18:

$$G_T(f) = \begin{bmatrix} G_U & 0 & f & 50 \\ aG_U & 50 & f & 100 \\ bG_U & 100 & f & 150 \\ cG_U & 150 & f & 200 \end{bmatrix} \quad 19$$

where the scaling factor constants a, b, and c are determined based on Equation 18, and $G_u$ is the highest acceleration level of the test profile which also corresponds to the maximum vibrational force exerted on the product being tested. This sinusoidal acceleration input function $G_T(f)$ is illustrated in the frequency domain in FIG. 4.

Therefore, the scaling factor constants for the loading level $G_T(f)$ determine the shape of the laboratory test profile.

(iv) Calculate the stress response curve

The stress response curve H(f) of the product is obtained from a dynamic stress analysis by using CAE tools, such as the ABAQUS finite element analysis software tool as sold by Hibbitt, Karlsson and Sorensen, Inc, 1080 Main Street, Pawtucket, R.I. This stress response curve H(f) is the transmissibility function from the input vibration acceleration forces to the local vibration stress. The resulting data file for H(f) is a list of H values for selected frequencies, as is well known in this art area, and will be used in the determination of test loading levels in the next steps.

(v) Specify the number of test sweeps

The number of the sweeps may be specified based on the capability of testing equipment and the testing time available. When formulating an efficient testing protocol, fewer sweeps are better. However, from an accuracy perspective, as more frequency sweeps are incorporated the test simulates the field acceleration more accurately, because the reduced number of sweeps requires higher acceleration force levels which may cause product failure mechanism shift or which the testing equipment may not be able to generate.

Substituting the stress frequency response curve H(f) as calculated in the previous step, such as the one illustrated in FIG. 2, into Equation 16, together with Equations 18 and 19, the relationship between the highest vibration acceleration level and the desired number of sweeps can be determined as follows:

$$G_u = \left\{ \frac{11.1x(\sqrt{2})^m \Gamma\left(\frac{m}{2}+1\right) \sum_i \frac{Mf_{0,i}}{\lambda_i v_i} \left[\int_0^{200} PSD_{g,i}(f)H^2(f)df\right]^{\frac{m}{2}}}{N_w \left[\int_0^{50} H^m(f)df + \int_{50}^{100} a^m H^m(f) df - \int_{100}^{150} b^m H^m(f) df - \int_{150}^{200} c^m H^m(f) df\right]} \right\}^{\frac{1}{m}} \quad 20$$

This equation provides solutions for the G(f) acceleration forces as a function of the number of sweeps $N_w$. These relationships can be plotted as illustrated by the $G_u$ line in FIG. 5. The aGu, bGu, and cGu acceleration forces required are also plotted in order to determine the trade off between acceleration forces and testing time required during the tests. For example, the $G_u$ line shows that approximately 4.2 g's of acceleration would be required for 0–50 Hz frequency band, 1.6 g's for the 50–100 Hz frequency band, 0.94 g's for the 100–150 hz frequency band, and 1.9 g's for the 150–200 Hz frequency band. Even if the testing equipment were capable of generating these loads, a larger number of frequency sweeps at lower g-force loading would be preferred because they more closely approximate the g-force loadings actually observed in the field.

A comprehensive judgment then can be made based on testing time available, test machine capability, and concerns over failure mechanism shift. In general, 18 to 36 sweeps are recommended, but as few as 5 and as many as 100 frequency sweeps may be required by the particular testing requirements. In the preferred method, 18 sweeps are deemed the preferred number for $N_w$.

(vi) Specify the loading level

Figure 5:
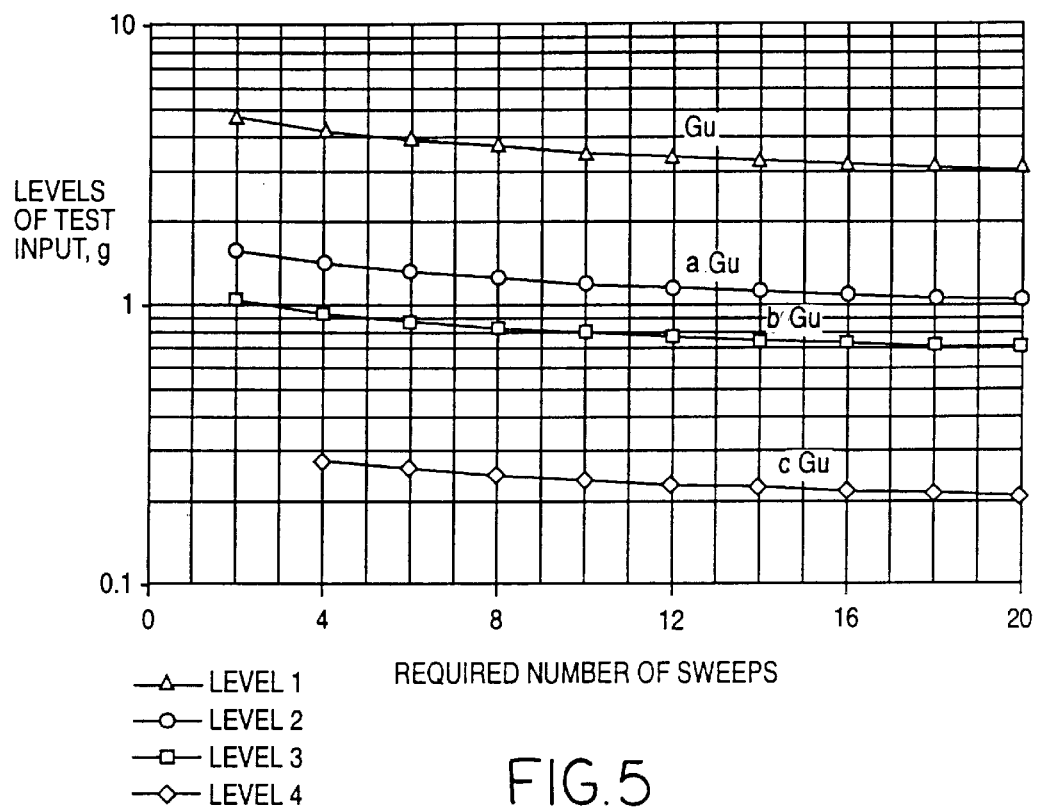
FIG. 5 illustrates an example of the laboratory vibration level versus required test duration for a specific product at a given location within the vehicle.

Once the number of vibration sweeps is determined in step (v) above, the loading level of the vibration test input can then be calculated according to Equations 19 and 20, or observed from the Gu, aGu, bGu and cGu lines as shown in FIG. 5. The laboratory testing equipment is set up for the chosen acceleration levels over the prescribed frequency bands.

(vii) Run the laboratory testing

The laboratory accelerated testing s then performed using the selected sweep type, the selected sweep rate, the shape/scaling factors and the number of sweeps. If no failures are observed during the testing, then the proposed design for the product should not fail in field operation during the expected lifetime of the product. If the product fails before the laboratory testing is complete, then laboratory testing must be extended and additional failures determined for the extended testing duration or enlarged sample testing. A method for determining the additional testing required and the success or failure of the laboratory testing is disclosed in my copending patent application Ser. No. 08/543,418, filed Oct. 16, 1995, and entitled "Method to Reduce Sample Size In Accelerated Reliability Verification Tests", which is incorporated herein by reference.

INSTRUMENT CLUSTER EXAMPLE

In this section, an instrument cluster is used as an example to illustrate the application of the accelerated durability testing process described above. The instrument cluster consists of a plastic box, a Printed Wiring Board (PWB), and several heavy display components with insertion leads. The potential failure mechanism is the fatigue due to vibration at the lower corner of the component insertion leads. The relationship between stress amplitude S and cycles to failure of the lead material is determined from material fatigue testing and is:

$$N = 2.54 \times 10^{19} S_A^{-6.11} \quad 21$$

The logarithmic frequency sweep is selected and the sweep rate is chosen as a 10-minute sweep from 5 Hz to 200 Hz.

FIG. 3 shows seven PSD curves measured at the instrument panel of a light truck driven on seven road surfaces during a proving ground test. The average driving speed, the required driving distance, and the driving time are listed in Table 1. This proving ground driving test may be considered to be equivalent to customer usage of the light truck for 150,000 miles. Based on the seven PSD curves and the information listed in Table 1, the composite PSD curve is determined according to Equations 17 and 18. The dashed curve in FIG. 3 is the composite PSD curve which will be used to determine the test acceleration level. From the composite PSD curve, the constants a, b, and c that determine the shape of laboratory test profile are calculated as a=0.33, b=0.22, and c=0.06 from Equation 18.

The dynamic vibrational stress analysis was performed by using the finite element method. The stress response curve H(f) at the root of the lead is obtained and plotted in FIG. 2. Substituting the stress response curve and the material property m=6.11 (given by Equation 21) into Equation 20, the relationship between the highest vibration level and the required number of sweep is plotted in FIG. 5.

If $N_w=18$ is selected as a compromise between too few and too many sweeps, the vibration levels are calculated according to Equation 19. The results are summarized in Table 2. Since the testing time for each sweep is 20 minutes, the testing time for each axis is 6 hours (20 minutes times 18 sweeps) and the total testing time is 18 hours for three axis testing.

TABLE 1

Field Road Load Conditions (150,000 Miles Equivalent)

| Road Condition | Average Driving Speed (MPH) | Driving Distance (Mile) | Driving Time and Percentage (Hour, %) |
|---|---|---|---|
| 1. Power Hop Hill | 27 | 173 | 6.4, 1.38 |
| 2. Silver Creek | 20 | 2074 | 103.7, 22.3 |
| 3. Pot Holes | 12 | 23 | 1.9, 0.4 |
| 4. Cobble Stones (A.D.) | 27 | 1008 | 37.3, 8.0 |
| 5. Undulating Road (A.D.) | 27 | 992 | 36.7, 7.9 |
| 6. Wash Board (A.D.) | 27 | 611 | 22.6, 4.9 |
| 7. Others | 57 | 14559 | 255.4, 55 |
| Total | | 19440 | 464, 100 |

DETERMINATION OF THE GENERIC TEST REQUIREMENT

The laboratory test requirement specified in Table 2 is for a particular product for which the property of the material associated with the potential failure is known, and for which the transmissibility function can be calculated from dynamic finite element analysis. However, generic laboratory test requirements for a given vehicle location may be required when these properties are not readily available or known. In this case, a laboratory testing method must be developed such that the method is independent of transmissibility and material properties. Conservative engineering assumptions may be used to estimate the effects of transmissibility (stress response function) and material property.

The method proposed by the present invention provides a practical approach that is reasonably conservative. The procedures to determine sweep type and sweep rate, the shape of the laboratory test profile, and the number of test sweeps are same as described above. Only the method to determine the level of test input will be modified, as explained below.

The relationship between the highest vibration level and the desired number of sweeps expressed in Equation 20 can also be written as:

$$G_u = \left\{ \frac{11.1(\sqrt{2})^m \Gamma\left(\frac{m}{2}-1\right) PSD^{\frac{m}{2}} \sum_i \frac{Mf_{0,i}}{\lambda_i v_i}}{N_W} \left[ \frac{\int_0^{50} H^2(f)df + \int_{50}^{100} a^2 H^2(f)df + \int_{100}^{150} b^2 H^2(f)df - \int_{150}^{200} c^2 H^2(f)df}{\int_5^{50} H^m(f)df + \int_{50}^{100} a^m H^m(f)df - \int_{100}^{150} b^m H^m(f)df - \int_{150}^{200} c^m H^m(f)df} \right]^{\frac{m}{2}} \right\} \quad (22)$$

TABLE 2

Laboratory Test Requirement of Instrument Cluster Correlated to Field Damage

| Selection of Number of | Acceleration (g) | Frequency (Hz) | Number Axis | Total sweep | Total Duration |
|---|---|---|---|---|---|
| 18 | 3.3 | 5–50 | 3 | 54 | 18 |
| | 1.1 | 50–100 | | | |
| | 0.7 | 100–150 | | | |
| | 0.2 | 150–200 | | | |

Figure 2:
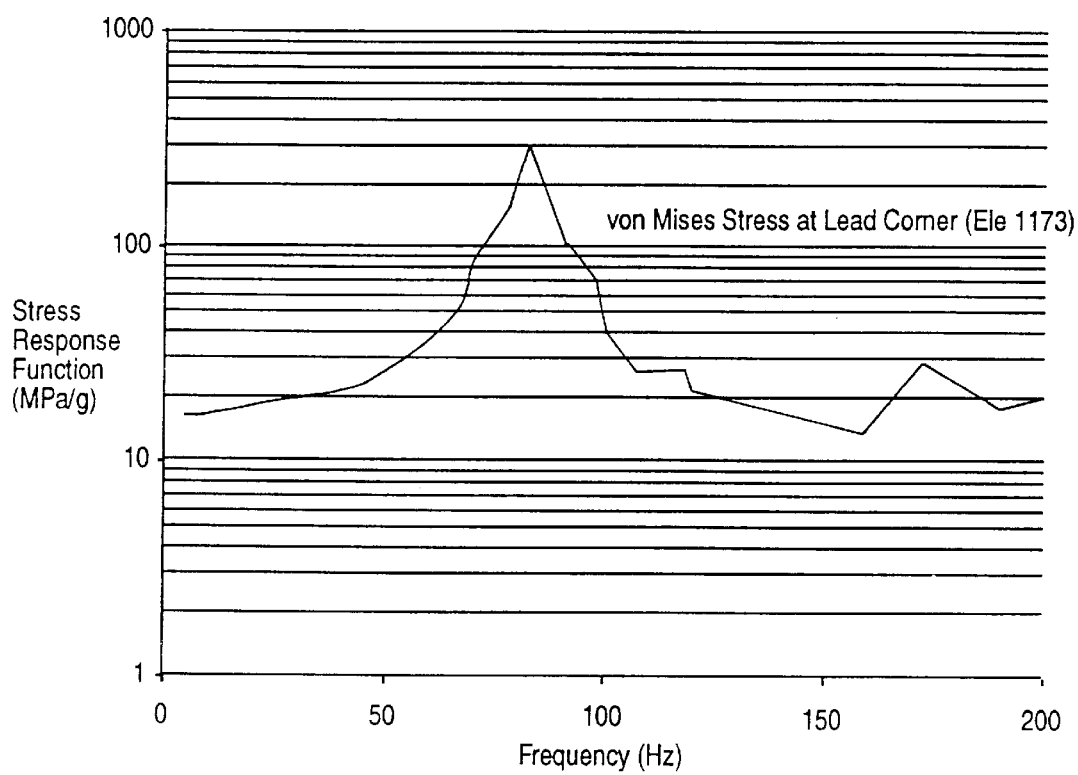
FIG. 2 illustrates an example of PSD curves measured from the field data.

For most products, the transmissibility function has a sharp peak at the natural resonant frequency of the product, such as in FIG. 2. Therefore, the transmissibility function may be approximated with the one degree-of-freedom formula as follows:

$$H(f) = \frac{D}{(2\pi f_n)^2 \sqrt{\left[1-\left(\frac{f}{f_n}\right)^2\right]^2 - \left[2\zeta\left(\frac{f}{f_n}\right)\right]^2}} \quad (23)$$

where D is a constant indicating the relationship between the local stress and the relative displacement, $f_n$ is the natural resonant frequency of the structure, and z is the damping ratio.

Since the shape of H(f) forms a sharp peak, the value of the integral outside the frequency range containing the natural frequency will be very small in both the numerator and the denominator of Equation 22. Therefore, the effect of the transmissibility on Equation 22 can be estimated by investigating the following integral ratio:

$$\text{Integral Ratio} = \frac{\left[\int_0^{50} H^2(f)df + \int_{50}^{100} a^2 H^2(f)df - \int_{100}^{150} b^2 H^2(f)df - \int_{150}^{200} c^2 H^2(f)df\right]^{\frac{m}{2}}}{\int_5^{50} H^m(f)df + \int_{50}^{100} a^m H^m(f)df - \int_{100}^{150} b^m H^m(f)df - \int_{150}^{200} c^m H^m(f)df}$$

$$= \frac{\left\{\int_{f_1}^{f_{i-1}} H^2(f)df\right\}}{\int_{f_1}^{f_{i-1}} H^m(f)df}$$

where $f_i$ to $f_{i+1}$ is the frequency range containing the primary frequency.

Figure 6:
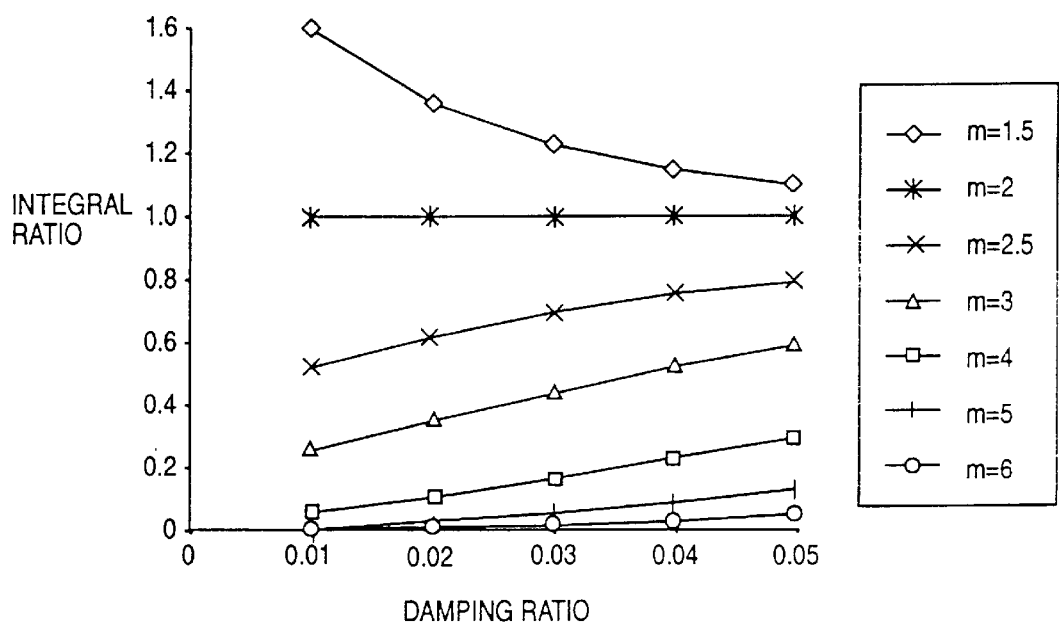
FIG. 6 illustrates the effect of damping ratio on the integral ratio for different materials.
Figure 7:
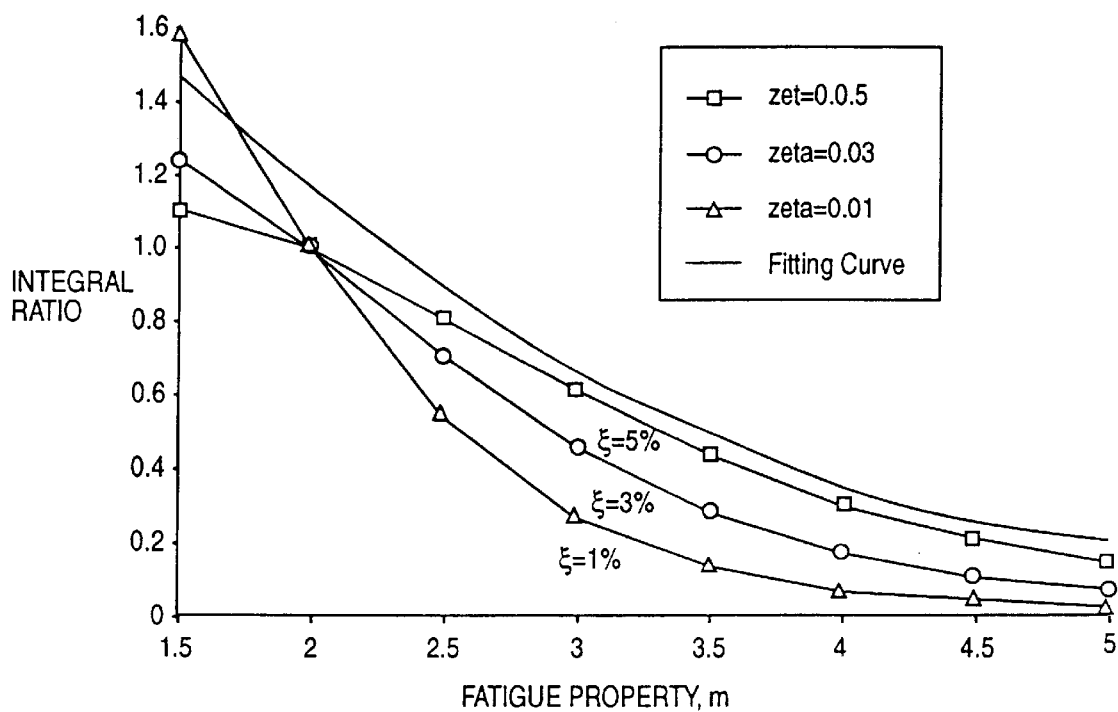
FIG. 7 illustrates the effect of fatigue property on the integral ratio, including the derived fitting curve.

Substituting Equation 23 into Equation 24 gives the value of the integral ratio as a function of damping ratio z and fatigue property m. For most products and structures, the damping ratio is usually between z=1% and z=5% and the fatigue property is usually between m=1.5 and m=5. FIG. 6 shows that the effect of the damping ratio on the integral ratio is not very strong. However, the integral ratio is strongly dependent on the material property m. Since the damping ratio of the products is usually less than 5%, a fitting curve based on z=5% is obtained as an upper bound, as illustrated in FIG. 7. The equation of the fitting curve is expressed by:

Integral Ratio=$0.09(5.3-m)^3-0.18$    25

Therefore, the effect of transmissibility on the upper level of input acceleration in Equation 22 may be estimated as:

$$G_u = \left\{ [(m-5.5)^2 + 2](\sqrt{2})^m \Gamma\left(\frac{m}{2} - 1\right) \right\}^{\frac{1}{m}} \frac{\left\{ PSD_u^{\frac{m}{2}} \sum_i \frac{Mf_{g,i}}{v_i} \right\}^{\frac{1}{m}}}{N^{\frac{1}{m}}} \quad 26$$

Now, further assume the fatigue property is m=3 (which is the average of value for the most frequently used materials in automotive components), then the following equation for determining the highest acceleration force level for the test input can be developed:

$$G_u = 3.14x \sqrt{PSD_u} \left\{ \frac{1}{N_W} \sum_i \frac{Mf_{g,i}}{v_i} \right\}^{\frac{1}{3}} \quad 27$$

Figure 8:
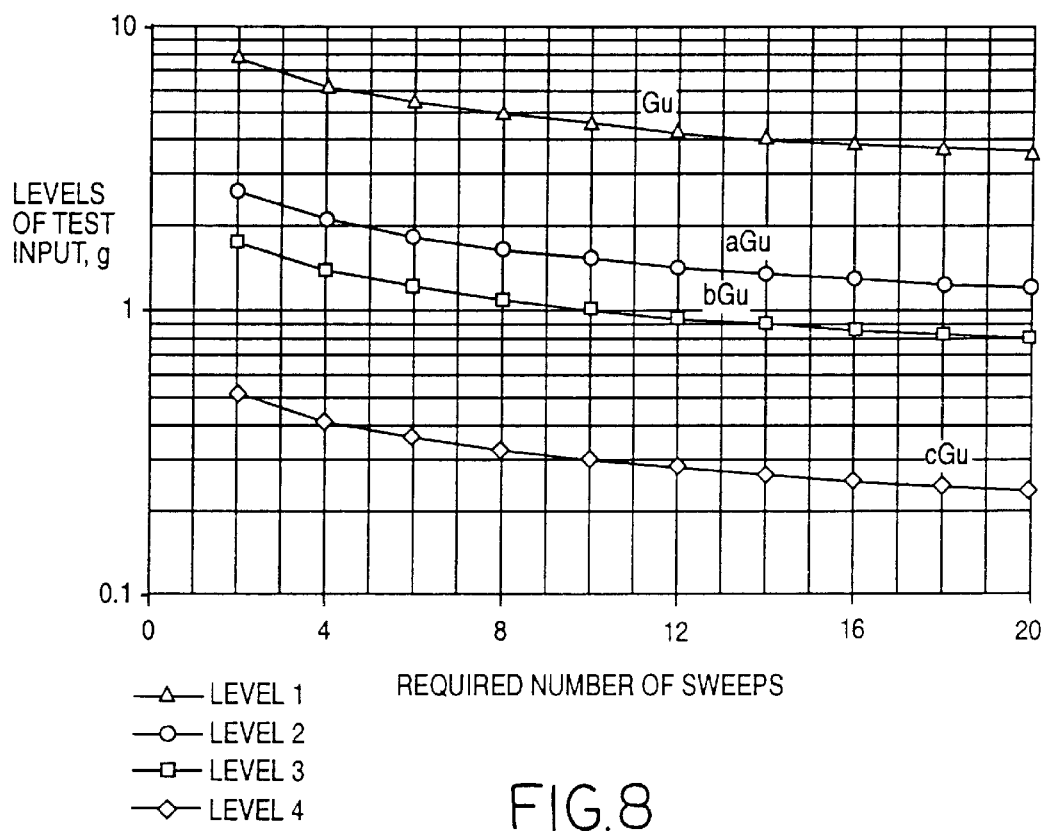
FIG. 8 illustrates the generic laboratory vibration acceleration levels as a function of required test sweeps for a given location within the vehicle.

The conservative test requirement is then determined for any product mounted on the instrument panel. In a similar manner to step (v) above, the relationship between the highest acceleration force level and the required number of sweeps is plotted in FIG. 8. Selecting the number of sweeps $N_W$=18, the vibration levels are calculated according to Equation 27, which is summarized in Table 3. Since the testing time for each sweep is 20 minutes, the total testing time is 18 hours for a three axis test. The results are summarized in Table 3.

As will be apparent, this method uses general engineering assumptions in order to allow Equation 27 to be substituted for Equation 20 in step (v), which in turn allows step (iv) to be omitted if the stated assumptions are valid.

TABLE 3

Laboratory Test Requirement of Products Mounted on Instrument panel

| Selection of Number of | Acceleration (g) | Frequency (Hz) | Number Axis | Total Sweep | Total Duration |
|---|---|---|---|---|---|
| 18 | 3.8 | 5–50 | 3 | 54 | 18 |
|  | 1.3 | 50–100 |  |  |  |
|  | 0.8 | 100–150 |  |  |  |
|  | 0.3 | 150–200 |  |  |  |

In summary, the laboratory test requirement to insure product durability is dependent on the geometry of the product and the material associated with the failure. The required vibration level for a given test time or the required test time for a given vibration level can be accurately determined for a product with known geometry, provided that the structural transmissibility can be calculated, and that the material properties are known. A correct vibration specification can be developed based on the damage equivalence technique according to the vehicle miles/speed and the PSD curves measured at the vehicle zone in which the product will be mounted for real customer usage profiles. If the geometry and material properties are unknown, conservative engineering assumptions may be used for making the accelerated testing generally independent of these functions. Using this method, it may be possible to simulate 150,000 miles of driving in only 18 hours of accelerated laboratory vibration testing.

Figure 9:
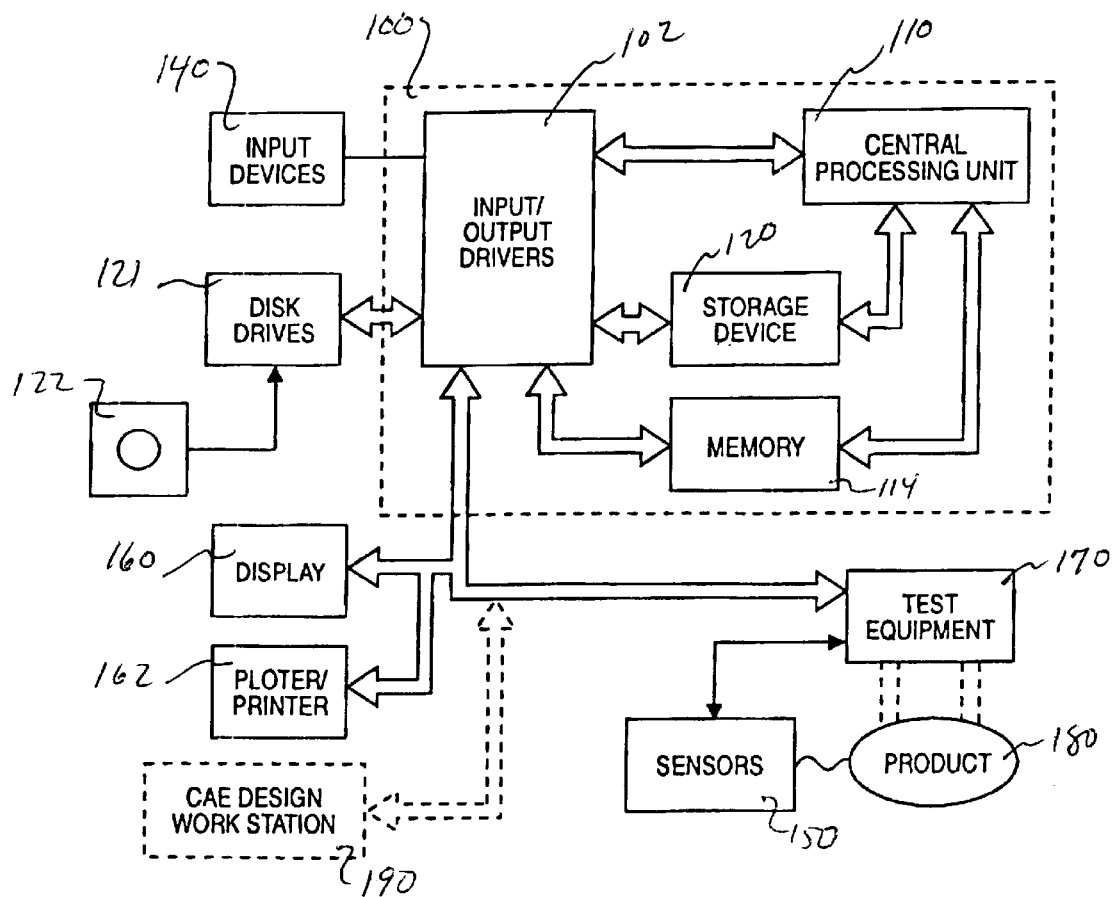
FIG. 9 illustrates a schematic block diagram of a computer system as controlled by the method and program in accordance with the method of the present invention.

The method in accordance with the present invention may be implemented either on a special purpose computer/ microcontroller or on the general purpose computer which is illustrated generally as 100 in FIG. 9. The computer 100 includes input/output driver circuitry 102 that receives data from input devices 140 and sensors 150. An example of input device 140 would be a computer keyboard, while an example of the sensors 150 would include voltage sensors, vibration sensors, strain gauges, accelerometers, load cells, torque sensors, etc., input/output drivers 102 are couple to a central processing unit (CPU) 110 that performs calculations and other steps in accordance with the method described herein. An example of a CPU used for the present invention would be PA-RISC 7200 processors from Hewlett-Packard Company, Palo Alto, Calif. The program that directs the central processing unit 110 is stored within a storage device 120, that may comprise a hard drive, a floppy drive, non-volatile memory or some other storage medium capable of recording and playing back algorithms and computer programs in accordance with the present invention. The storage device 120 also may include various physical parameters, distributions, materials data bases, load (environmental or road load) data bases, physical characterizations, etc., that are required during the execution of the computer program, and which may be stored and retrieved most efficiently on the storage device 120. The central processing unit 110 also as coupled to sufficient memory 114 for receiving and storing selected portions of the computer program and data being operated upon by the central processing unit 110.

Other outputs of the input/output drivers 102 may be coupled to a system display 160 and plotter/printer 210, such as a CRT display, and to test equipment 170 that operates upon the product being tested 180. The test equipment 170 may respond directly to commands from the computer 100 as required to specify the frequency distribution, load amplitude, voltages, etc., in order to control the testing on the product 180. Examples of test equipment 170 include power amplifiers, shaker tables, exciter controller, recorders, conditioning amplifiers, measuring amplifiers, and force transducers As previously discussed, multiple sensors 150 may be coupled either directly to the product 180 (such as voltage sensors, strain gauges, accelerometers, load cells, corgue sensors) or the sensors 150 may be coupled, either directly or indirectly, to the test equipment 170 (such as position sensors, strain gauges or other similar sensors) if such sensors are not included in the test equipment 170.

The method in accordance with the present invention may be completely automated on a general purpose computer, such as the one illustrated in FIG. 9, or may be partially implemented through operator controllers of the test equipment and sensors in accordance with information and instructions illustrated on the display 160. Various alphanumeric inputs may be entered through the input device 140 or through various transportable storage media 122. Examples of such transportable storage media include magnetic floppy disks, magnetic tapes and optical disks that may be read through compatible drives 126, that in turn are coupled to either the input/output drivers 102 or directly to the storage device 120. Either the method/program in accordance with the present invention, or various data necessary for running the program, or both, may be stored upon and distributed by means of the magnetic storage medium 122.

It also may be possible to couple the output of a Computer Aided Engineering (CAE) workstation 190 to either the input device 140 or directly to the input/output drivers 102 of the computer 100. In this manner, CAE workstation designs, rather than actual prototype testing data, may be fed directly into the computer 100 for analysis and testing in accordance with the method of the present invention. In a similar manner, it may also be possible to couple the input/output drivers 102 directly to the CAE workstation so that results of the testing and analysis may be coupled directly to the product design being developed in the CAE workstation so that appropriate product design parameters may be adjusted in accordance with the test results. It also may be possible to simulate the accelerated testing methodology on a CAE workstation using finite element analysis and durability analysis techniques rather than building a prototype and testing it on the test equipment 170 and with the sensors 150 as discussed above. This simulation testing may be accomplished either on the computer 100, or a computer program in accordance with the teachings of the present invention may be incorporated as a module into the software used in the CAE workstation to design and analyze the product. Under these circumstances, the computer program in accordance with the present invention would probably be executed directly upon the CAE workstation 190.

Figure 10:
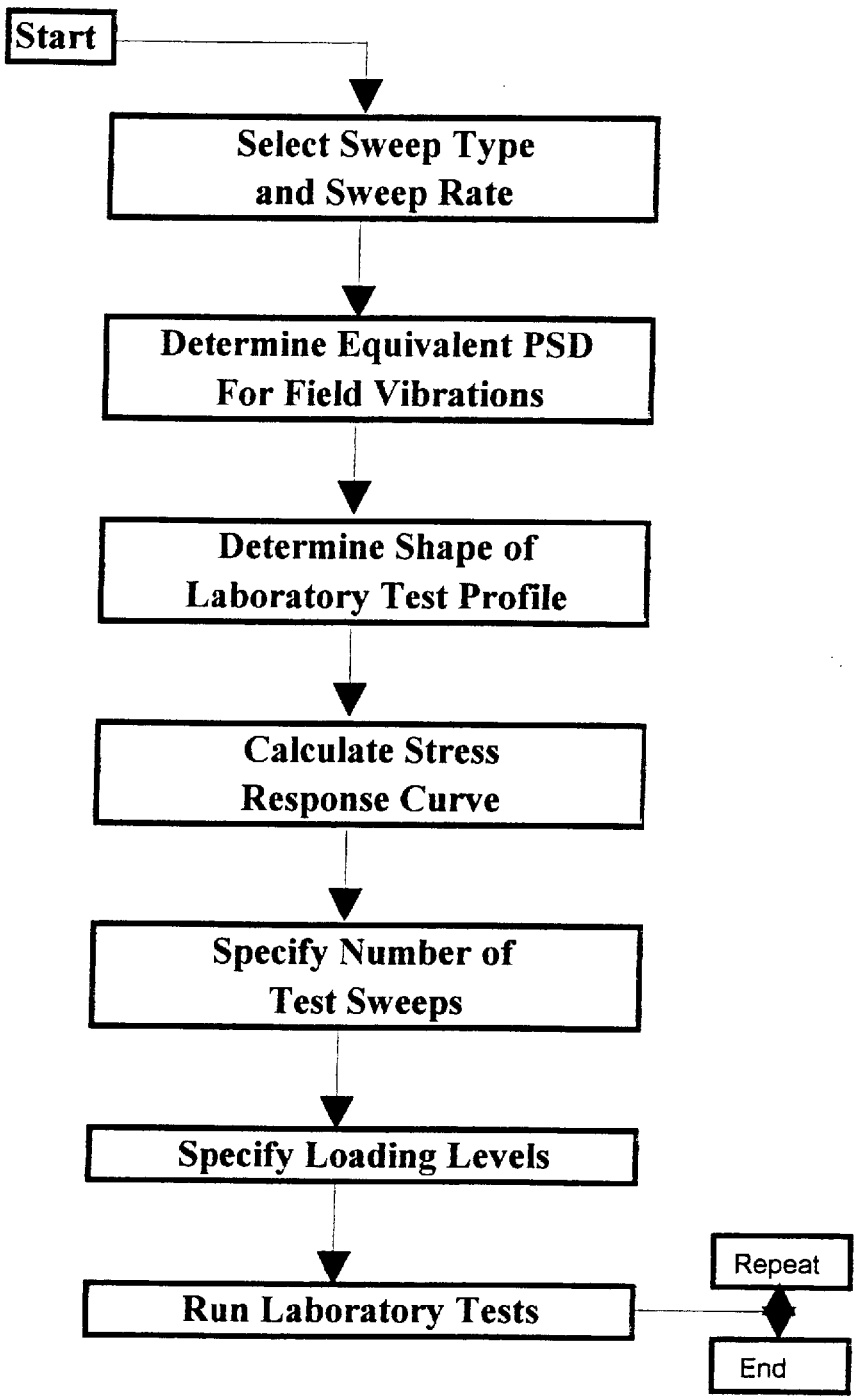
FIG. 10 illustrates a flow diagram for a computer program in accordance with the present invention.

A logic flow diagram for implementing the method in accordance with the present invention on a computer is illustrated in FIG. 10.

While the best mode of the method has been described in detail, one skilled in this art will be capable of numerous variations, modifications and adaptations without departing from the spirit and scope of the present invention. It should be understood that the present invention is not limited to the processes, embodiments or examples contained herein, but are limited only by the scope of the following claims.

I claim:

1. An application program stored in a memory and executed in a computer for determining the testing profile for accelerated laboratory sinusoidal vibrational testing of a product, comprising the steps of:

(i) selecting the type and rate for the frequency sweep to be used in the accelerated testing, (ii) developing a simplified composite Power Spectral Density function $PSD_j$, including scaling coefficients, representative of the PSD for random vibration loadings in expected field vibration levels, (iii) developing the acceleration function $G_T(f)$, corresponding to $PSD_j$ and using the PSD scaling coefficients, for producing on the product the test acceleration forces corresponding to the $PSD_j$ function, (iv) calculating the stress response curve $H(f)$ for the product representative of the transmissibility function from the input acceleration forces to the local vibration stress forces, (v) calculating the range of acceleration forces $G_u$ required for implementing $G_T(f)$ from the relationship $$G_u = \left\{ \frac{ Kx(\sqrt{2})^m \Gamma\left(\frac{m}{2} - 1\right) \sum_i \frac{M_j f_{0,i}}{\lambda_i v_i} \left[ \int_0^{200} PSD_{g,i}(f) H^2(f) df \right]^{\frac{m}{2}} }{ N_w \left[ \int_0^{50} H^m(f) df + \int_{50}^{100} a^m H^m(f) df - \int_{100}^{150} b^m H^m(f) df - \int_{150}^{200} c^m H^m(f) df \right] } \right\}^{\frac{1}{m}}$$

where K is a constant, selecting the number of frequency sweeps $N_w$ based on the capabilities of the testing equipment and the testing time available, (vi) recalculating the acceleration forces $G_u$ based on the scaling coefficients and the selected value of $N_w$, and then (vii) testing the product using the selected sweep type, sweep rate, $G_u$ acceleration forces and $N_w$ frequency sweeps, to validate the required performance lifetime for the product when no test failures are observed over all of the $N_w$ test sweeps.

2. The application program for accelerated testing as described in claim 1, further comprising the step of:

(viii) redesigning the product to eliminate the root cause of failures observed in the $N_w$ test sweeps.

3. The application program for accelerated testing as described in claim 1, further comprising the step of:

(ix) testing an enlarged sample size of the product samples for $N_w$ test sweeps after the failure of the first product test to determine if the failure was statistically significant.

4. The application program for accelerated testing as described in claim 1, wherein step (i) includes the substep:

(ii) selecting a logarithmic type sweep.

5. The application program for accelerated testing as described in claim 1, wherein step (i) includes the substep:

(i2) selecting a sweep rate of approximately 10 minutes from frequencies of approximately 5 Hz to 200 Hz.

6. The application program for accelerated testing as described in claim 1, wherein step (ii) includes the substeps of selecting a PSD including four spectral bandwidths such that $$PDS_j = \frac{\sum_i \frac{Mf_{g,i}}{v_i} \int_{f_{j-1}}^{f_j} PSD_{g,i}(f)df}{(f_j - f_{j-1}) \sum_i \frac{Mf_{g,i}}{v_i}} \quad j = 1, 2, 3, 4$$

which is then simplified to $$PSD_j = \begin{bmatrix} PSD_1 & 0 & f & f1 \\ a^2 \ PSD_1 & f1 & f & f2 \\ b^2 \ PSD_1 & f2 & f & f3 \\ c^2 \ PSD_1 & f3 & f & f4 \end{bmatrix}$$

wherein the scaling coefficients are a, b and c.

7. The application program for accelerated testing as described in claim 6, wherein step (ii) includes the substeps of selecting $f_1$ as approximately 50 Hz, selecting $f_2$ as approximately 100 Hz, selecting $f_3$ as approximately 150 Hz, and selecting $f_4$ as approximately 200.

8. The application program for accelerated testing as described in claim 1, wherein step (iii) includes the substep of developing the acceleration function $G_T$ (f) to correlate with the frequencies $f_1$, $f_2$, $f_3$ and $f_4$, as well as the scaling coefficients a, b, and c.

9. The application program for accelerated testing as described in claim 1, wherein step (iii) includes the substep of defining $G_T$ (f) as $$G_T(f) = \begin{bmatrix} G_U & 0 & f & f1 \\ aG_U & f1 & f & f2 \\ bG_U & f2 & f & f3 \\ cG_U & f3 & f & f4 \end{bmatrix}$$

10. The application program for accelerated testing as described in claim 1, wherein step (iv) includes the substep of selecting $N_w$ from the range of approximately 12 to 20.

11. The application program for accelerated testing as described in claim 10, wherein step (iv) includes the substep of selecting $N_W$ as approximately 18.

12. A computer system for determining the testing profile for accelerated laboratory sinusoidal vibrational testing of a product in accordance with an application program that controls testing equipment coupled to and for testing the product in accordance with test signals, the system comprising:

a control processing unit coupled to and for controlling the testing equipment, a memory for storing the application program for controlling the central processing unit, program means for selecting a logarithmic type frequency sweep covering the range of from approximately 5 Hz to 200 Hz in approximately 10 minutes, program means for developing a simplified composite Power Spectral Density function $PSD_j$, including scaling coefficients a, b, c and d, representative of the PSD for random vibration loadings in expected field vibration levels in the frequency bands defined by approximately 0 Hz, 50 Hz, 100 Hz, 150 Hz and 200 Hz, program means for developing the acceleration function $G_T$ (f), corresponding to $PSD_j$ and using the PSD scaling coefficients, for producing on the product the test acceleration forces corresponding to the $PSD_j$ function, program means for calculating the stress response curve H(f) for the product representative of the transmissibility function from the input acceleration forces to the local vibration stress forces, program means for selecting the number of frequency sweeps equal to approximately 18 and then calculating the acceleration forces $G_u$ required for implementing $G_T$ (f) from the relationship $$G_u = \left\{ \frac{Kx(\sqrt{2})^m \Gamma\left(\frac{m}{2} + 1\right) \sum_i \frac{Mf_{0,i}}{\lambda_i v_i} \left[\int_0^{200} PSD_{g,i}(f)H^2(f)df\right]^{\frac{m}{2}}}{N_W \left[\int_0^{50} H^m(f)df + \int_{50}^{100} a^m H^m(f)df + \int_{100}^{150} b^m H^m(f)df - \int_{150}^{200} c^m H^m(f)df\right]} \right\}^{\frac{1}{m}}$$

program means for generating said test signal for testing the product using the selected sweep type, sweep rate, $G_u$ acceleration forces and $N_w$ number of frequency sweeps, to validate the required performance lifetime for the product when no test failures are observed over all of the $N_w$ test sweeps.

13. The computer system for accelerated testing as described in claim 12, further comprising program means for changing critical design parameters of the product to eliminate the root cause of failures observed in the $N_w$ test sweeps.

14. The computer system for accelerated testing as described in claim 13, further comprising:

program means for testing an enlarged sample size of the product samples for $N_w$ test sweeps after the failure of the first product test to determine if the failure was statistically significant.

15. A computer readable memory for scoring an application program that controls a central processing unit for determining the testing profile for accelerated laboratory sinusoidal vibrational testing of a product, by performing the steps of:

(i) defining the type and rate for the frequency sweep too be used in the accelerated testing, (ii) instructing the central processing unit to develop a simplified composite Power Spectral Density function $PSD_j$, including scaling coefficients, representative of the PSD for random vibration loadings in expected field vibration levels, (iii) instructing the central processing unit to develop an acceleration function $G_T(f)$, corresponding to $PSD_j$ and using the PSD scaling coefficients, for producing on the product the test acceleration forces corresponding to the $PSD_j$ function, (iv) instructing the central processing unit to calculate the range of acceleration forces $G_u$ required for implementing $G_T(f)$ from the relationship $$G_u = 3.14x \sqrt{PSD_u} \left\{ \frac{1}{N_W} \sum_i \frac{Mf_{g,i}}{v_i} \right\}^{\frac{1}{3}}$$

and then to select the number of frequency sweeps $N_w$ based on the capabilities of the testing equipment and the testing time available, (v) instructing the central processing unit to recalculate the acceleration forces $G_u$ based on the scaling coefficients and the selected value of $N_w$, and then (vi) instructing the central processing unit to control the testing of the product using the selected sweep type, sweep rate, $G_u$ acceleration forces and $N_w$ number of frequency sweeps, to validate the required performance lifetime for the product when no test failures are observed over all of the $N_w$ test sweeps.

16. The accelerated testing method as described in claim 15, further comprising the step of:

(vii) instructing the central processing unit to test an enlarged sample size of the product samples for $N_w$ test sweeps after the failure of the first product test to determine if the failure was statistically significant.

17. The computer readable memory as described in claim 15, further comprising the step of:

(viii) instructing the central processing unit to redesign the product to eliminate the root cause of failures observed in the $N_w$ test sweeps.

* * * * *